(12) United States Patent
Frisk et al.

(10) Patent No.: US 7,695,810 B2
(45) Date of Patent: Apr. 13, 2010

(54) STRIP TAPE

(75) Inventors: Peter Frisk, Tokyo (JP); Hiroaki Ogita, Tokyo (JP); Norio Kobayashi, Tokyo (JP)

(73) Assignee: Tetra Laval Holdings & Finance S.A. (CH)

( * ) Notice: Subject to any disclaimer, the term of this patent is extended or adjusted under 35 U.S.C. 154(b) by 1121 days.

(21) Appl. No.: 10/296,445

(22) PCT Filed: Jun. 15, 2001

(86) PCT No.: PCT/JP01/05106

§ 371 (c)(1),
(2), (4) Date: Jun. 9, 2003

(87) PCT Pub. No.: WO01/98082

PCT Pub. Date: Dec. 27, 2001

(65) Prior Publication Data

US 2003/0235700 A1     Dec. 25, 2003

(30) Foreign Application Priority Data

Jun. 15, 2000   (JP) .............................. 2000-179804

(51) Int. Cl.
*B32B 7/12* (2006.01)
*B32B 15/04* (2006.01)

(52) U.S. Cl. ....................... 428/343; 428/344; 428/349; 428/354; 428/355 R

(58) Field of Classification Search ................. 428/343, 428/344, 349, 354, 355 R, 254
See application file for complete search history.

(56) References Cited

U.S. PATENT DOCUMENTS

| | | | |
|---|---|---|---|
| 3,201,374 A * | 8/1965 | Simms ................... 526/318.45 |
| 4,796,800 A | 1/1989 | Kobinata .................... 229/5.7 |
| 4,865,902 A * | 9/1989 | Golike et al. ................ 428/215 |
| 4,983,435 A * | 1/1991 | Ueki et al. ................. 428/36.6 |
| 5,242,757 A * | 9/1993 | Buisine et al. .............. 428/480 |
| 5,300,354 A * | 4/1994 | Harita et al. ................ 428/215 |
| 5,380,479 A * | 1/1995 | Schrenk et al. ............. 264/241 |
| 5,399,619 A * | 3/1995 | Torradas et al. ............... 525/57 |
| 5,492,741 A * | 2/1996 | Akao et al. ................ 428/35.2 |
| 5,622,780 A * | 4/1997 | Paleari ....................... 428/328 |
| 5,695,838 A * | 12/1997 | Tanaka et al. .............. 428/35.2 |
| 6,333,087 B1 | 12/2001 | Jerdee et al. ............... 428/35.9 |
| 6,406,644 B2 | 6/2002 | Jerdee et al. ........... 252/188.28 |
| 6,558,760 B1 * | 5/2003 | Paleari et al. .............. 428/34.8 |
| 6,569,506 B1 | 5/2003 | Jerdee et al. ............... 428/35.7 |
| 6,592,975 B1 | 7/2003 | Ueyama et al. ............. 428/212 |

FOREIGN PATENT DOCUMENTS

| | | |
|---|---|---|
| JP | 6-344506 | 12/1994 |
| JP | 10-67975 | 3/1998 |

OTHER PUBLICATIONS

Computer translation of JP 06-344506 (see IDS filed Nov. 4, 2004 for author, title and date).*

* cited by examiner

*Primary Examiner*—Victor S Chang
(74) *Attorney, Agent, or Firm*—Bacon & Thomas, PLLC

(57) ABSTRACT

The present invention is drawn to a strip tape which does not undergo lowering of bonding force and which does not cause pollution of the natural environment, working environment, etc. The strip tape includes a center layer containing a polar resin, and at least one polyolefin layer laminated, via a bonding layer, on each face of the center layer. The bonding layer contains an ethylene-methacrylic acid-alkyl acrylate random copolymer. Since the strip tape includes a center layer and at least one polyolefin layer, the interlayer bonding force of the strip tape is high, the bonding strength between the center layer and the polyolefin layer can be increased, and the waterproofing property of the strip tape can be enhanced. Even when a packaging container including the strip tape is heated or cooled sharply during use, the interlayer bonding force of the strip tape is not lowered.

10 Claims, 1 Drawing Sheet

FIG. 1

|  | Example | | | | Comparative Example | |
|---|---|---|---|---|---|---|
|  | 1 | 2 | 3 | 4 | 1 | 2 |
| Interlayer bonding strength (N/15 mm) | 8.1 | 6.3 | 8.5 | 5.8 | 6.5 | 2.8 |
| Interlayer bonding strength after immersion in water for two weeks (N/15 mm) | 6.4 | 6.3 | 7.0 | 3.2 | 1.3 | Less than 0.1 |

STRIP TAPE

TECHNICAL FIELD

The present invention relates to a strip tape for a liquid food container, and more particularly to a strip tape for strongly bonding, within a packaging container for storing liquid food, overlap portions of a packaging material.

BACKGROUND ART

Conventionally, most packaging containers for storing liquid food such as milk, juice, liquor, cola drink, or coffee are formed by folding a packaging material prepared from a laminate including paper, plastic, metallic foil, metal-deposited film, etc., in combination. Edge portions of the folded packaging material are overlapped with each other and welded. In order to prevent liquid food from leaking or oozing through the overlap portions to the outside of the packaging container, the overlap portions facing the interior of the packaging container are strongly bonded together by use of a strip tape.

The strip tape is formed of, for example, a laminate including a center layer of a polar resin and a polyolefin layer laminated on each face of the center layer. When the laminate is formed, at least one of the center layer and the polyolefin layer is subjected to anchor coating, and then the polyolefin layer is laminated on each face of the center layer. Usually, a thermosetting adhesive obtained by dissolving, for example, a polyester resin in an organic solvent is used as an anchor-coating agent for carrying out the aforementioned anchor coating.

However, when the strip tape including the center layer and the polyolefin layer, at least one of the layers being subjected to anchor coating, is used, liquid food is absorbed in the strip tape from an edge portion thereof, and thus the interlayer bonding force is lowered. When the packaging container is heated or cooled drastically during use thereof, the interlayer bonding force is further lowered. As a result, the center layer and the polyolefin layer exfoliate from each other, resulting in a deterioration in the function of the strip tape for protecting liquid food contained in the packaging container. In addition, the strip tape having the aforementioned structure has low thermal stability and poor oxygen-barrier property.

Moreover, since the aforementioned anchor-coating agent contains an organic solvent, when anchor coating is carried out or when the polyolefin layer is laminated on each face of the center layer, the organic solvent disperses, and thus the natural environment or the working environment is polluted.

In order to solve the aforementioned problems in relation to the conventional strip tape, an object of the present invention is to provide a strip tape which does not undergo lowering of bonding force and which does not cause pollution of the natural environment or the working environment.

DISCLOSURE OF THE INVENTION

To achieve the above object, the present invention provides a strip tape comprising a center layer formed of a polar resin, and at least one polyolefin layer laminated, via a bonding layer, on each face of the center layer.

The bonding layer contains an ethylene-methacrylic acid-alkyl acrylate random copolymer.

Since the strip tape includes a center layer and at least one polyolefin layer laminated, via a bonding layer, on each face of the center layer, the interlayer bonding force is high, the center layer and the polyolefin layer can be bonded together with increased strength, and the waterproofing property of the strip tape can be enhanced. In addition, even when a packaging container including the strip tape is heated or cooled drastically during use thereof, the interlayer bonding force is not lowered.

When liquid food is stored in a packaging container produced by use of the strip tape, the liquid food stored in the packaging container can be effectively protected, because the center layer and the polyolefin layer of the strip tape do not exfoliate from each other, and leak or oozing of the liquid food from the overlap portion of the packaging material can be prevented over a long period of time. The strip tape has high thermal stability and improved oxygen-barrier property.

Since the strip tape has high thermal stability and improved oxygen-barrier property, the thickness of the strip tape can be commensurately reduced, and thus the amount of the raw material for producing the strip tape can be reduced.

Also, since the bonding layer does not contain an organic solvent, the strip tape does not pollute the natural environment or the working environment, and the risk of fire hazards is reduced.

Moreover, since anchor coating is not carried out when the strip tape is produced, the production process can be simplified, and high-speed production can be realized. In addition, the strip tape is not smudged with an adhesive contained in the anchor-coating agent, and other problems such as blocking do not arise.

In another strip tape of the present invention, the bonding layer contains an ethylene-methacrylic acid-alkyl acrylate random copolymer containing methacrylic acid in an amount of 3-5 wt. % and an alkyl acrylate in an amount of 0.05-0.2 wt. %.

In yet another strip tape of the present invention, the bonding layer contains an ethylene-methacrylic acid-alkyl acrylate random copolymer having a melt flow rate of 11-15 g/10 minutes, a density of 0.927-0.932 g/cm$^3$, and a Vicat softening point of 68-72° C.

In still another strip tape of the present invention, the alkyl acrylate is either methyl acrylate or ethyl acrylate.

In yet another strip tape of the present invention, the polar resin is either an ethylene-vinyl alcohol copolymer or a polyester.

BRIEF DESCRIPTION OF THE DRAWING

FIG. 1 is a table showing the results of measurement of the interlayer bonding strength of a strip tape.

BEST MODE FOR CARRYING OUT THE INVENTION

The embodiments of the present invention will next be described in detail with reference to the drawing.

The strip tape of the present invention includes a center layer containing a polar resin. Examples of the polar resin which may be employed include ethylene-vinyl alcohol copolymers (EVOH), polyesters, vinyl acetate, ethylene-vinyl acetate copolymers, and polyamides. Particularly, ethylene-vinyl alcohol copolymers or polyesters are preferably used.

Examples of the polyesters which may be employed include polyethylene terephthalate (PET), polybutylene terephthalate, copolymers of ethylene terephthalate and ethylene isophthalate, polyethylene-2,6-naphthalate, polyhexamethylene terephthalate, and copolymers of hexamethylene terephthalate and 1,4-cyclohexanedimethylene terephthalate.

The polar resin is used without any treatment. Preferably, the polar resin is subjected to monoaxial or biaxial stretching, and is used in the form of film having a typical thickness of about 10-50 μm. The center layer may be the polar resin film, particularly a deposition film obtained by depositing, for example, silicon oxide ($SiO_x$) or aluminum oxide ($Al_2O_3$) onto the face of a polyester film. When the deposition film is used, the oxygen barrier property of the strip tape can be enhanced.

In the manufacture of the strip tape of the present invention, both surfaces of the center layer are coated with polyolefin; i.e., polyolefin layers serving as outer layers are laminated on the center layer. Examples of the polyolefin which may be employed include monopolymers of ethylene or α-olefin (e.g., propylene, 1-butene, 1-hexene, 4-methyl-1-pentene, or 1-octene), and copolymers of ethylene and α-olefin. Particularly, polyethylene (e.g., low-density polyethylene (LDPE), middle-density polyethylene (MDPE), high-density polyethylene (HDPE), linear low-density polyethylene (LLDPE), or linear low-density polyethylene produced by use of a metallocene catalyst (mLLDPE)), polypropylene (e.g., homopolypropylene, a propylene-ethylene random copolymer, or a propylene-ethylene block copolymer), polybutene-1, or poly 4-methyl-pentene-1 is preferably used.

The aforementioned linear low-density polyethylene is produced through copolymerization of ethylene and C4-C8 α-olefin serving as a comonomer (preferably α-olefin containing 6 or more carbon atoms, such as 1-hexene, 4-methyl-1-pentene, 1-heptene, or 1-octene) in the presence of a metallocene catalyst.

The aforementioned metallocene catalyst is a combination of metallocene and an aluminum compound serving as a promoter, wherein metallocene is a compound having a structure in which a transition metal such as titanium, zirconium, or hafnium is sandwiched by an unsaturated cyclic compounds containing, for example, a π-electron-containing cyclopentadienyl group or a substituted cyclopentadienyl group, and the aluminum compound promoter is, for example, alkyl aluminoxane, alkyl aluminum, aluminum halide, or alkyl aluminum halide. The aforementioned polyolefin layer is preferably formed from polyethylene, particularly from low-density polyethylene or linear low-density polyethylene of the aforementioned polyolefins.

The polyolefin is used without any treatment. Preferably, the polyolefin is subjected to monoaxial or biaxial stretching, and is used in the form of film having a typical thickness of about 10-200 μm. In the strip tape of the present invention, at least one polyolefin layer is formed on each face of the center layer. However, two or more polyolefin layers may be formed. When two or more polyolefin layers are formed, the polyolefin layers may be formed of identical or different materials. Also, the polyolefin layers may have the same thickness or different thicknesses.

If necessary, a variety of additives or similar materials may be added to at least one of the center layer and the polyolefin layer.

The strip tape of the present invention is formed by laminating at least one polyolefin layer, via a bonding layer, on each face of the center layer. The bonding layer contains an ethylene-methacrylic acid-alkyl acrylate random copolymer containing methacrylic acid in an amount of 3-5 wt. % and an alkyl acrylate in an amount of 0.05-0.2 wt. %, and having a melt flow rate of 11-15 g/10 minutes (JIS K6760), a density of 0.927-0.932 g/cm³ (JIS K6760), and a Vicat softening point of 68-72° C. (JIS K6760).

Examples of the alkyl acrylate which may be employed include methyl acrylate, ethyl acrylate, butyl acrylate, hexyl acrylate, and 2-ethylhexyl acrylate. Particularly, methyl acrylate or ethyl acrylate is preferably used. An ethylene-methacrylic acid-alkyl acrylate random copolymer having the aforementioned properties is produced through random copolymerization of ethylene, methacrylic acid, and an alkyl acrylate by means of a customary method for producing ethylene-methacrylic acid random copolymers.

No particular limitation is imposed on the method for laminating at least one polyolefin layer, via the bonding layer, on each face of the center layer, and a customary lamination method is employed. Examples of the lamination method employed include a dry lamination method in which at least one of a film containing the aforementioned polar resin and a film of the aforementioned polyolefin is coated with a film serving as the bonding layer, and the polar resin film and the polyolefin film are press-bonded; a sandwich lamination method in which the aforementioned polar resin and the aforementioned polyolefin are melted and extruded from, for example, an extruder, and then laminated on both surfaces of a film serving as the bonding layer; a sandwich lamination method in which the material of a film for forming the bonding layer is melted and extruded from, for example, an extruder, and then laminated on both surfaces of a film containing the aforementioned polar resin, and a film of the aforementioned polyolefin is laminated on the extruded bonding layer film; and a co-extrusion lamination method in which the aforementioned polar resin, the aforementioned polyolefin, and the material of a film for forming the bonding layer are melted and separately extruded from dies such as flat dies or circular dies provided in, for example, an extruder, and are laminated with one another.

The bonding layer typically has a thickness of 5-30 μm. Before the polyolefin layer is laminated, via the bonding layer, on the center layer, at least one of the center layer and the polyolefin layer may be subjected to corona discharge treatment, in order to further increase bonding strength. The thus-formed strip tape typically has a width of 4-30 mm.

As described above, since the strip tape having the aforementioned structure includes a center layer containing a polar resin and at least one polyolefin layer laminated, by the mediation of a bonding layer, on each face of the center layer, the interlayer bonding force is high, the center layer and the polyolefin layer can be bonded together with increased strength, and the waterproofing property of the strip tape can be enhanced. Even when a packaging container including the strip tape is heated or cooled drastically during use of the container, the interlayer bonding force is not lowered.

When liquid food is stored in a packaging container produced by use of the strip tape, the liquid food stored in the packaging container can be effectively protected, since the center layer and the polyolefin layer of the strip tape are not exfoliated from each other, and, over a long period of time, the liquid food never leak or ooze through the overlap portion of a packaging material. Moreover, the strip tape has high thermal stability and improved oxygen-barrier property.

Since the strip tape has high thermal stability and improved oxygen-barrier property, the thickness of the strip tape can be reduced accordingly, and thus the amount of the raw material for producing the strip tape can be reduced.

Moreover, since the bonding layer does not contain an organic solvent, deterioration of the natural environment or the working environment is prevented, and the risk of fire hazards is reduced.

Furthermore, since anchor coating is not carried out when the strip tape is produced, the production process can be simplified to thereby attain high-speed production. In addition, the strip tape is not smudged with an adhesive contained in an anchor-coating agent, and other problems such as blocking do not arise.

EXAMPLE 1

An ethylene-methacrylic acid-methyl acrylate random copolymer containing methacrylic acid (4 wt. %) and methyl acrylate (0.1 wt. %) and having a melt flow rate of 13 g/10 minutes, a density of 0.930 g/cm$^3$, and a Vicat softening point of 70° C. was melted and extruded from an extruder onto each face of a biaxially stretched film (thickness: 12 μm containing an ethylene-vinyl alcohol copolymer, such that the thickness of the extruded film was 25 μm, and a low-density polyethylene film having a thickness of 12 μm was laminated on the extruded ethylene-methacrylic acid-methyl acrylate random copolymer film, to thereby produce a composite film.

EXAMPLE 2

A film (thickness: 15 μm) of the same ethylene-methacrylic acid-methyl acrylate random copolymer as employed in Example 1 was laminated on each face of the ethylene-vinyl alcohol copolymer film employed in Example 1. Subsequently, a linear low-density polyethylene film having a thickness of 20 μm was laminated on the surface of the random copolymer film, to thereby produce a composite film.

EXAMPLE 3

In a manner similar to that of Example 1, the ethylene-methacrylic acid-methyl acrylate random copolymer employed in Example 1 was melted and extruded onto each face of a biaxially stretched polyethylene terephthalate film having a thickness of 15 μm, and a low-density polyethylene film having a thickness of 20 μm was laminated on the extruded ethylene-methacrylic acid-methyl acrylate random copolymer film, to thereby produce a composite film.

EXAMPLE 4

The procedure of Example 2 was repeated, except that a polyethylene terephthalate film (thickness: 10 μm) on which silicon oxide was deposited was used instead of the ethylene-vinyl alcohol copolymer film, to thereby produce a composite film.

COMPARATIVE EXAMPLE 1

An anchor-coating agent containing a thermosetting adhesive obtained by dissolving a polyester resin in an organic solvent was applied onto each face of the ethylene-vinyl alcohol copolymer film employed in Example 1 such that the thickness of the anchor-coating film became 25 μm after drying, and the applied anchor-coating agent was dried. Subsequently, the low-density polyethylene film employed in Example 1 was laminated on the anchor-coating film, to thereby produce a composite film. During production of the composite film, the organic solvent was released, and thus the working environment was considerably polluted.

COMPARATIVE EXAMPLE 2

The procedure of Example 1 was repeated, except that an ethylene-methacrylic acid random copolymer containing methacrylic acid (11 wt. %) and having a melt flow rate of 8 g/10 minutes, a density of 0.940 g/cm$^3$, and a Vicat softening point of 75° C. was used instead of the ethylene-methacrylic acid-methyl acrylate random copolymer employed in Example 1, to thereby produce a composite film.

The results of evaluation of the strip tape will next be described.

FIG. 1 is a table showing the results of measurement of the interlayer bonding strength of the strip tape.

A test piece (i.e., strip tape) having a width of 15 mm was formed from each of the composite films produced in Examples 1 through 4 and Comparative Examples 1 and 2, a 180-degree exfoliation test was carried out for each test piece by use of a tensile tester at an exfoliation rate of 300 mm/minute at 23° C. and a relative humidity of 50%, to thereby measure the lamination strength between the center layer and the polyolefin layer; i.e., interlayer bonding strength N/15 mm. The results are shown in FIG. 1. In FIG. 1, each value shows the average of the results of five test pieces formed from each composite film.

A brick-shaped packaging container for storing milk (inner volume: 200 ml) was formed from a packaging material formed of a laminate (low-density polyethylene film (thickness: 15 μm)/paper (basis weight: 150 g/m$^2$)/ethylene-vinyl alcohol copolymer film (thickness: 12 μm)/low-density polyethylene film (thickness: 15 μm)), such that the low-density polyethylene film laminated on the ethylene-vinyl alcohol copolymer film provided the inner face of the container. The overlap portions of the packaging material was bonded together by use of a strip tape (width: 15 mm) formed from each composite film of Examples 1 through 4 and Comparative Examples 1 and 2. The thus-formed packaging container was filled with water (200 ml), and then allowed to stand for two weeks. Thereafter, the bonding strength between the center layer and the polyolefin layer of the strip tape, the polyolefin layer having contacted water, was measured in a manner similar to that described above. The results are shown in FIG. 1.

As shown in FIG. 1, the strip tapes produced in Examples 1 through 4 have high interlayer bonding strength as compared with those produced in Comparative Examples 1 and 2. In addition, the degree of lowering of the interlayer bonding strength of the strip tapes produced in Examples 1 through 4 is low even after the strip tapes are immersed in water for two weeks.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention is applicable to a strip tape for a liquid food container.

The invention claimed is:

1. A strip tape for bonding together overlap portions of packaging material facing the interior surface of a packaging container, said strip tape comprising:
   (a) a center layer containing a polar resin; and
   (b) at least one polyolefin layer laminated, via a bonding layer on each face of the center layer, wherein
   (c) the bonding layer contains an ethylene-methacrylic acid-alkyl acrylate random copolymer;
   whereby the strip tape comprises the structure (b)-(c)-(a)-(c)-(b) wherein layers (c) are in direct contact with layer (a), and layers (b) are in direct contact with respective layers (c);

wherein the ethylene-methacrylic acid-alkyl acrylate random copolymer contains methacrylic acid in an amount of 3-5 wt.% and an alkyl acrylate in an amount of 0.05-0.2 wt. %;and wherein the ethylene-methacrylic acid-alkyl acrylate random copolymer has a melt flow rate of 11-15 g/10 minutes, a density of 0.927-0.932 g/cm$^3$, and a Vicat softening point of 68-72° C.

2. A strip tape according to claim 1, wherein the alkyl acrylate is either methyl acrylate or ethyl acrylate.

3. A strip tape according to claim 1, wherein the polar resin is either an ethylene-vinyl alcohol copolymer or a polyester.

4. A strip tape according to claim 1 wherein said center layer is a polyester film have a surface deposit of silicon oxide or aluminum oxide.

5. A strip tape according to claim 1 wherein said layers (b) are the outer layers of the strip tape.

6. A strip tape according to claim 5 wherein said layers (b) are monoaxially or biaxially stretched.

7. A strip tape according to claim 1 wherein the thickness of the respective layers are as follows:
 (a) is 10-50 μm;
 (b) is 10-200 μm; and
 (c) is 5-30 μm.

8. A strip tape according to claim 1 wherein layers (c) do not contain an organic solvent.

9. A strip tape according to claim 1 having a width of 4-30 mm.

10. A strip tape according to claim 1 wherein said bonding layer has a thickness of 5-30 μm.

* * * * *